United States Patent
Haneji et al.

(10) Patent No.: US 9,261,276 B2
(45) Date of Patent: Feb. 16, 2016

(54) BURNER COMBUSTION METHOD

(75) Inventors: Tomoyuki Haneji, Kai (JP); Kimio Iino, Kai (JP); Yasuyuki Yamamoto, Hokuto (JP); Yoshiyuki Hagihara, Kofu (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 427 days.

(21) Appl. No.: 13/980,770

(22) PCT Filed: Jan. 20, 2012

(86) PCT No.: PCT/JP2012/051209
§ 371 (c)(1),
(2), (4) Date: Jul. 19, 2013

(87) PCT Pub. No.: WO2012/102206
PCT Pub. Date: Aug. 2, 2012

(65) Prior Publication Data
US 2013/0309617 A1 Nov. 21, 2013

(30) Foreign Application Priority Data

Jan. 26, 2011 (JP) ................................ 2011-014080

(51) Int. Cl.
*F23N 1/02* (2006.01)
*F23C 6/04* (2006.01)
(Continued)

(52) U.S. Cl.
CPC . *F23N 1/02* (2013.01); *F23C 6/045* (2013.01); *F23C 7/02* (2013.01); *F23C 99/00* (2013.01);
(Continued)

(58) Field of Classification Search
CPC ............ F23C 6/045; F23C 7/02; F23C 99/00; F23C 2205/20; F23D 14/22; F23D 14/32; F23L 9/00; F23N 1/02; F23N 3/002; F23N 2037/26; Y02E 20/344
See application file for complete search history.

(56) References Cited

U.S. PATENT DOCUMENTS 4,846,665 A 7/1989 Abbasi
5,349,811 A * 9/1994 Stickler .................... F02C 9/28
60/39.281
(Continued)

FOREIGN PATENT DOCUMENTS

CN 1090030 A 7/1994
CN 101907043 A 12/2010
(Continued)

OTHER PUBLICATIONS

Office Action issued in Chinese Aplication No. 201280006770.6 dated Jan. 21, 2015 (w/partial translation).
(Continued)

*Primary Examiner* — Alfred Basichas
(74) *Attorney, Agent, or Firm* — Nixon & Vanderhye P.C.

(57) ABSTRACT

The present invention provides a burner combustion method for supplying and combusting an oxidant stream and a fuel stream, wherein the oxidant stream is composed of a primary oxidant stream jetted from around the periphery of the fuel stream or from a position near the fuel stream, and a plurality of secondary oxidant streams, and by periodically changing the flow rate of at least one of the primary oxidant stream and the plurality of secondary oxidant streams, and also causing a periodic change in the oxygen concentration within the oxidant stream, causing a periodic change in the oxygen ratio which is calculated by dividing the supplied amount of oxygen, supplied by the oxidant stream, by the theoretically required amount of oxygen, and providing a difference between the periodic changes in the oxygen concentration and the oxygen ratio, the combustion state adopts a periodic oscillating state.

12 Claims, 8 Drawing Sheets

(51) Int. Cl.
*F23C 7/02* (2006.01)
*F23C 99/00* (2006.01)
*F23D 14/22* (2006.01)
*F23L 9/00* (2006.01)
*F23D 14/32* (2006.01)
*F23N 3/00* (2006.01)

(52) U.S. Cl.
CPC ............... *F23D 14/22* (2013.01); *F23D 14/32* (2013.01); *F23L 9/00* (2013.01); *F23N 3/002* (2013.01); *F23C 2205/20* (2013.01); *F23N 2037/26* (2013.01); *Y02E 20/344* (2013.01)

(56) References Cited

U.S. PATENT DOCUMENTS

| | | | |
|---|---|---|---|
| 5,601,425 | A | 2/1997 | Kobayashi et al. |
| 5,791,889 | A * | 8/1998 | Gemmen ............... F23N 5/16 431/1 |
| 5,809,769 | A * | 9/1998 | Richards ............... F23N 5/16 431/114 |
| 2003/0041848 | A1 * | 3/2003 | Azuma ............... F02D 41/027 123/687 |
| 2004/0157178 | A1 | 8/2004 | Dugue et al. |

FOREIGN PATENT DOCUMENTS

| | | |
|---|---|---|
| EP | 0 046 898 A1 | 3/1982 |
| EP | 00 468 898 B1 | 2/1984 |
| EP | 0 144 918 A2 | 6/1985 |
| EP | 0 687 853 A3 | 12/1995 |
| EP | 0 687 853 A3 | 3/1997 |
| JP | 5-215311 | 8/1993 |
| JP | 6-213410 | 8/1994 |
| JP | 6-213411 | 8/1994 |
| JP | 6-257723 | 9/1994 |
| JP | 7-233920 | 9/1995 |
| JP | 11-182810 | 7/1999 |
| JP | 2000-171005 | 6/2000 |
| JP | 2000-171032 | 6/2000 |
| JP | 2001-311505 | 11/2001 |
| JP | 2004-523721 | 8/2004 |
| JP | 2007-232364 | 9/2007 |
| JP | 2008-527303 | 7/2008 |
| JP | 4132409 | 8/2008 |
| JP | 2011-179751 | 9/2011 |
| JP | B2-5357108 | 9/2013 |
| WO | WO 2006/074877 A1 | 7/2006 |

OTHER PUBLICATIONS

Notice of Allowance and English translation in JP 2011-014080 mailed Jan. 28, 2014.
Office Action issued in Chinese Application No. 201280006770.6 dated Jan. 21, 2015 (w/partial translation).
International Search Report for PCT/JP2012/051209 mailed Mar. 27, 2012.
Written Opinion of the International Searching Authority (foreign language) dated Mar. 27, 2012.

* cited by examiner

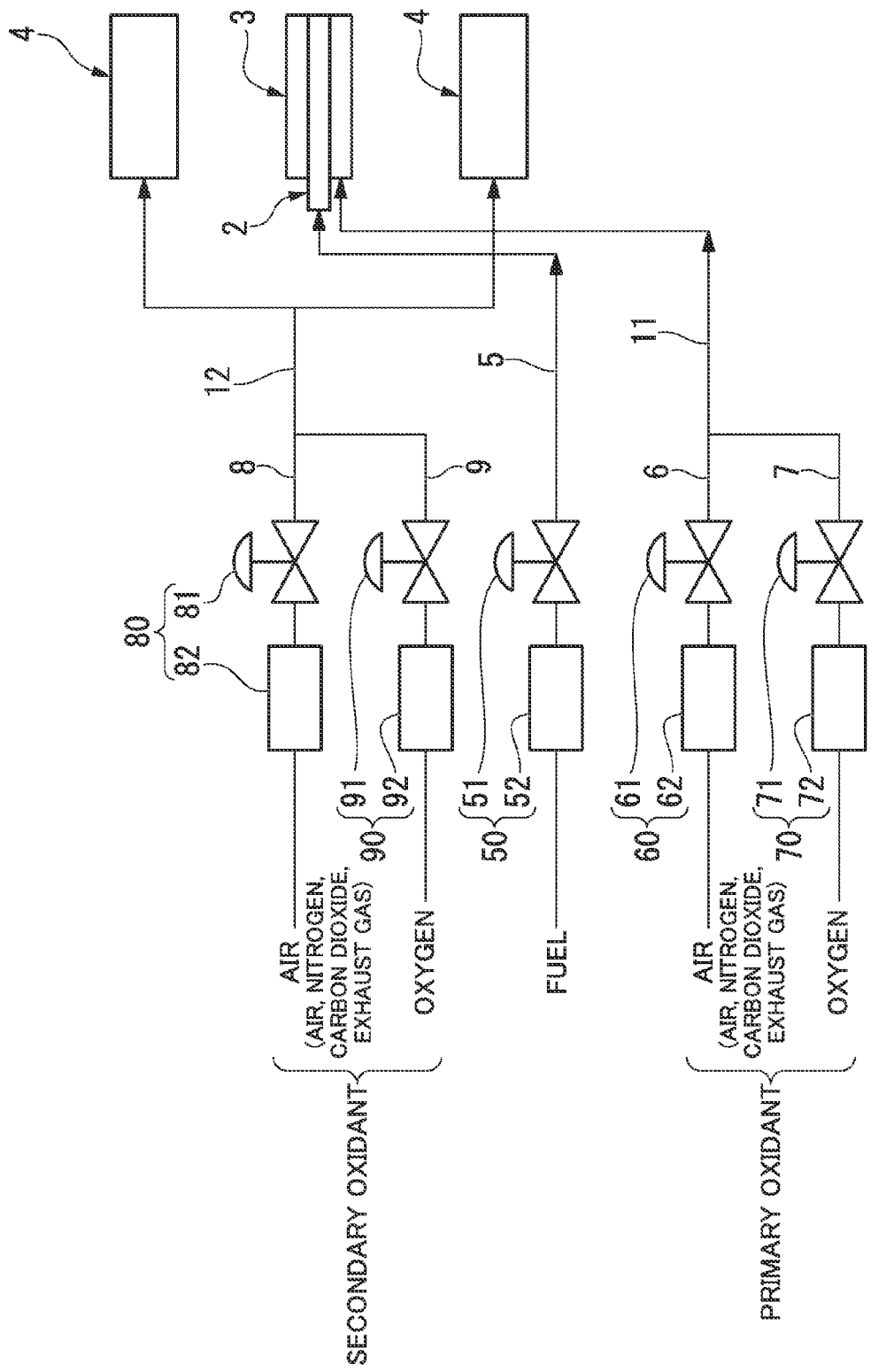

BURNER COMBUSTION METHOD

This application is the U.S. national phase of International Application No. PCT/JP2012/051209 filed 20 Jan. 2012 which designated the U.S. and claims priority to JP 2011-014080 filed 26 Jan. 2011, the entire contents of each of which are hereby incorporated by reference.

TECHNICAL FIELD

The present invention relates to a burner combustion method.

Priority is claimed on Japanese Patent Application No. 2011-014080, filed Jan. 26, 2011, the content of which is incorporated herein by reference.

BACKGROUND ART

In recent years, as considerable attention has been focused on environmental issues facing the earth, the reduction of nitrogen oxides (NOx) has been identified as one important issue, and is an issue requiring urgent attention. Among methods of reducing NOx, technology for inhibiting generation of NOx is very important, and techniques such as exhaust gas recirculation, lean burn combustion, thick and thin fuel combustion, and staged combustion are already known, and are being widely employed in industrial applications through to consumer applications. Although NOx countermeasures have progressed to some degree through application of low NOx combustors that apply these techniques, more effective methods of further reducing NOx are still being sought.

Among methods that aim to address the issues described above, one example of a method of reducing NOx that is the subject of ongoing research and development is a method of performing a type of timed thick and thin fuel combustion in which the flow rates of the fuel and the oxidant are changed periodically (hereafter referred to as "forced oscillating combustion") (see Patent Documents 1 to 6).

In this method, by oscillating control of the supply flow rate of either the fuel or the oxidant, or both the fuel and the oxidant, the stoichiometric ratio of the combustion flame is altered to generate alternating fuel-rich combustion and fuel-lean combustion, thereby achieving a reduction in the emission of NOx.

Further, Patent Document 7 discloses a method of reducing NOx that utilizes a pulsed combustion in which the oxidant is enriched using pure oxygen, so-called "forced oscillating combustion", as well as an apparatus for implementing this method.

Furthermore, Patent Documents 8 to 14 disclose so-called staged combustion methods in which the fuel and/or the oxidant are jetted into the furnace or combustion chamber in multiple stages, and also mention many effects of low NOx methods.

DOCUMENTS OF RELATED ART

Patent Documents

Patent Document 1: European Patent Publication, No. 0046898
Patent Document 2: U.S. Pat. No. 4,846,665
Patent Document 3: Japanese Unexamined Patent Application, First Publication No. Hei 6-213411
Patent Document 4: Japanese Unexamined Patent Application, First Publication No. 2000-171005
Patent Document 5: Japanese Unexamined Patent Application, First Publication No. 2000-171032
Patent Document 6: Japanese Unexamined Patent Application, First Publication No. 2001-311505
Patent Document 7: Japanese Unexamined Patent Application, First Publication No. Hei 5-215311
Patent Document 8: Japanese Unexamined Patent Application, First Publication No. Hei 6-257723
Patent Document 9: Japanese Unexamined Patent Application, First Publication No. Hei 7-233920
Patent Document 10: Japanese Patent (Granted) Publication No. 4,132,409
Patent Document 11: Japanese Unexamined Patent Application, First Publication No. 2007-232364
Patent Document 12: Japanese Unexamined Patent Application, First Publication No. Hei 6-213410
Patent Document 13: Published Japanese Translation No. 2004-523721 of PCT
Patent Document 14: U.S. Pat. No. 5,601,425

DISCLOSURE OF INVENTION

Problems to be Solved by the Invention

However, when the inventors of the present invention undertook further testing of the reduction effects, although they were able to identify some NOx reduction effects, they were unable to obtain reduction effects significant enough to have practical value, confirming that the development of innovative new technology is still required.

Against this type of background, a method of reducing NOx that is of practical value is keenly sought, but no such appropriately effective method currently exists.

Means to Solve the Problems

In order to address the issues described above, the inventors of the present invention undertook intensive research aimed at developing a method of reducing NOx that is of practical value. As a result, they discovered that by supplying a plurality of oxidant streams to the burner, and periodically changing at least one of a primary oxidant stream that is jetted from around the periphery of the fuel, and secondary oxidant streams that are jetted from positions separated from the fuel by a specified distance, an NOx reduction effect significantly larger than conventional effects could be obtained.

In other words, the present invention provides the aspects described below.

(1) A burner combustion method for supplying and combusting an oxidant stream and a fuel stream, wherein the oxidant stream is composed of a primary oxidant stream jetted from around the periphery of the fuel stream or from a position near the fuel stream, and a plurality of secondary oxidant streams, and by periodically changing the flow rate of at least one of the primary oxidant stream and the plurality of secondary oxidant streams, and also causing a periodic change in the oxygen concentration within the oxidant stream, causing a periodic change in the oxygen ratio which is calculated by dividing the supplied amount of oxygen, supplied by the oxidant stream, by the theoretically required amount of oxygen, and providing a difference between the periodic changes in the oxygen concentration and the oxygen ratio, the combustion state adopts a periodic oscillating state.

(2) The burner combustion method according to (1) above, wherein the plurality of secondary oxidant streams are jetted from symmetrical positions centered around the fuel stream.

(3) The burner combustion method according to (1) of (2) above, wherein the ratio of the flow rate of the primary oxidant stream relative to the flow rate of the oxidant stream is at least 10% but not more than 70%.

(4) The burner combustion method according to any one of (1) to (3) above, wherein the flow rate of the secondary oxidant streams is changed periodically.

(5) The burner combustion method according to (4) above, wherein the frequency of the periodic change in the flow rate of the secondary oxidant streams is at least 0.01 Hz but not more than 20 Hz.

(6) The burner combustion method according to any one of (1) to (5) above, wherein the difference between the upper limit and the lower limit of the periodically changing oxygen ratio is at least 0.2, and the average value of the oxygen ratio across a single period is at least 1.0.

(7) The burner combustion method according to any one of (1) to (6) above, wherein the periodic changes in the oxygen concentration and the oxygen ratio have the same frequency.

(8) The burner combustion method according to (7) above, wherein the phase difference between the periodic changes in the oxygen concentration and the oxygen ratio is at least $\pi/2$ but not more than $3\pi/2$.

(9) The burner combustion method according to any one of (1) to (8) above, wherein the flow rate of the fuel stream is changed periodically, the periodic change in the flow rate of the fuel stream and the periodic change in the oxygen ratio have the same frequency, and the phase difference between the periodic changes in the flow rate of the fuel stream and the oxygen ratio is at least $\pi/2$ but not more than $3\pi/2$.

(10) The burner combustion method according to any one of (1) to (9) above, wherein the oxidant stream is composed of oxygen and air.

(11) The burner combustion method according to any one of (1) to (9) above, wherein the oxidant stream is composed of oxygen and a combustion exhaust gas.

(12) The burner combustion method according to (10) or (11) above, wherein the oxygen is substantially pure oxygen.

Effects of the Invention

The present invention can provide a burner combustion method that can significantly and reliably reduce NOx. Further, the present invention can not only be applied when designing new combustors, but can also be applied to existing combustors.

BRIEF DESCRIPTION OF THE DRAWINGS

FIG. 5 is a schematic view illustrating one example of lines of the burner according to the first embodiment of the present invention.

EMBODIMENTS OF THE INVENTION

Figure 1:
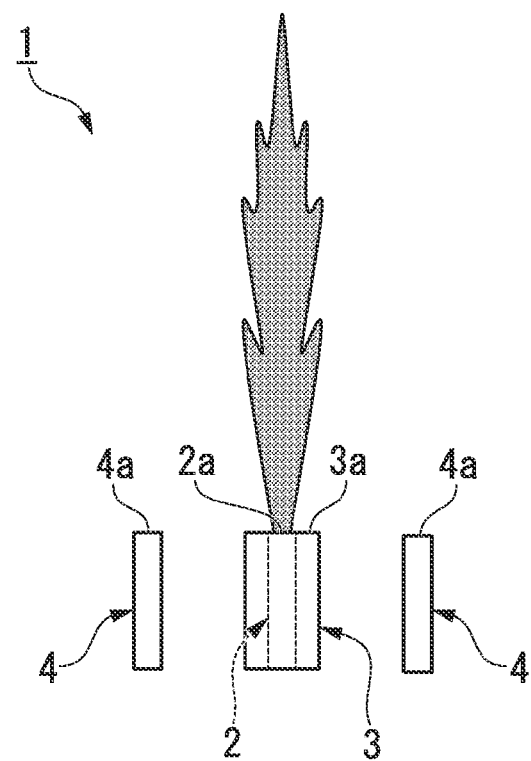
FIG. 1 is a side view illustrating an outline of a burner according to a first embodiment of the present invention.

Preferred examples of the present invention are described below, but the present invention is in no way limited by these examples. Additions, omissions, substitutions, and other modifications can be made without departing from the spirit or scope of the present invention.

First Embodiment

A burner combustion method that represents a first embodiment of application of the present invention is described below in detail with reference to the drawings. The drawings used in the following description have in some cases been drawn with certain features enlarged in order to assist with comprehension of those features, and as a result, the dimensional ratios between each of the structural elements in the drawings may not necessarily be the same as the actual ratios.

Figure 2:
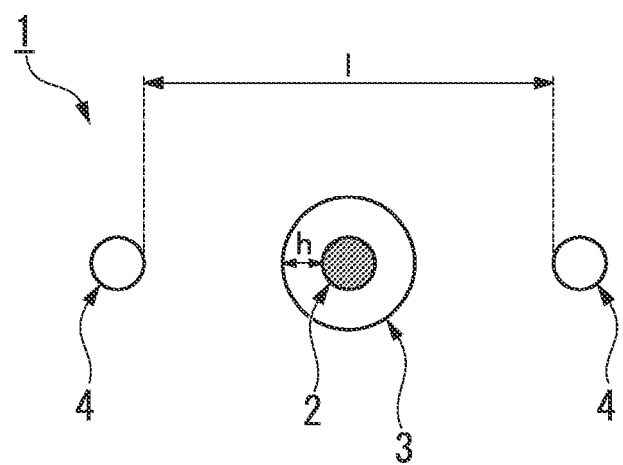
FIG. 2 is a plan view illustrating an outline of the burner according to the first embodiment of the present invention.

As illustrated in FIG. 1 and FIG. 2, a burner 1 used in the present embodiment is composed basically of a fuel nozzle 2 that jets a fuel stream (fuel fluid), a primary oxidant nozzle 3 that jets a primary oxidant stream (primary oxidant fluid), and a plurality of secondary oxidant nozzles 4 that jet a secondary oxidant stream (secondary oxidant fluid).

As illustrated in FIG. 1, the fuel nozzle 2, the primary oxidant nozzle 3 and the secondary oxidant nozzles 4 are all formed with cylindrical shapes, and are formed with the lengthwise directions of the nozzles all lying along the same direction. Accordingly, the direction in which the fuel nozzle 2 jets the fuel stream, the direction in which the primary oxidant nozzle 3 jets the primary oxidant stream, and the direction in which the secondary oxidant nozzles 4 jet the secondary oxidant streams are all the same direction. However, the direction in which the secondary oxidant nozzles 4 jet the secondary oxidant streams is not limited to the configuration described above, and the direction of the secondary oxidant streams need not necessarily be the same as the other streams. The secondary oxidant nozzles 4 may be installed with an outward-facing angle of up to 20° relative to the lengthwise direction of the primary oxidant nozzle 3.

Further, a jetting surface $2a$ provided at the jetting outlet of the fuel nozzle 2, a jetting surface $3a$ provided at the jetting outlet of the primary oxidant nozzle 3, and jetting surfaces $4a$ provided at the jetting outlets of the secondary oxidant nozzles 4 are all formed within the same plane. Accordingly, as illustrated in FIG. 1, when the burner 1 is viewed from the side, the jetting surface 2a of the fuel nozzle 2, the jetting surface 3a of the primary oxidant nozzle 3, and the jetting surfaces 4a of the secondary oxidant nozzles 4 exist along a single straight line.

Further, the primary oxidant nozzle 3 is provided around the periphery of the fuel nozzle 2 or near the fuel nozzle 2. Here, the expression that the primary oxidant nozzle 3 is provided "around the periphery or near" the fuel nozzle 2 means that the primary oxidant nozzle 3 and the fuel nozzle 2 are positioned within a specified distance of each other, and means that the primary oxidant nozzle 3 is positioned substantially adjacent to the fuel nozzle 2.

As a result, the oxidant stream can be jetted from a position that is substantially adjacent to the position from which the fuel stream is jetted.

Furthermore, in the present embodiment, as illustrated in FIG. 2, the fuel nozzle 2 and the primary oxidant nozzle 3 are formed concentrically. Specifically, the fuel nozzle 2 is formed with a circular cylindrical shape, and the primary oxidant nozzle 3 is formed so as to encircle the outer periphery of the fuel nozzle 2. In other words, the primary oxidant nozzle 3 is formed so that the cross-sectional shape of the nozzle is a ring shape (donut shape) having a specific width h, and the fuel nozzle 2 is positioned inside the inner periphery of the ring-shaped primary oxidant nozzle 3.

However, the positioning of the fuel nozzle 2 and the primary oxidant nozzle 3 is not limited to the configuration described above, and the cross-sectional shape of the primary oxidant nozzle 3 need not necessarily be a ring shape, provided that the primary oxidant nozzle 3 is provided substantially around the periphery of the fuel nozzle 2 or near the fuel nozzle 2.

A plurality of the secondary oxidant nozzles 4 are disposed in symmetrical positions centered around the fuel nozzle 2. Accordingly, when viewed in plan view, as illustrated in FIG. 2, the secondary oxidant nozzles 4 are disposed in point symmetrical positions relative to the fuel nozzle 2. When a fuel calorific value is based on a case of 100 Mcal/h, the distance l between the secondary oxidant nozzles 4 is preferably within a range from 10 to 50 cm, and more preferably from 30 to 50 cm. Further, the range for the distance l at a desired calorific value may be set using the ⅓ power law of the desired calorific value relative to 100 Mcal/h which is a base value of the fuel calorific value.

However, the positioning of the plurality of secondary oxidant nozzles 4 is not limited to the configuration described above, and the secondary oxidant nozzles 4 may be positioned within a desired distance range from the fuel nozzle 2 determined in accordance with factors such as the flow velocities of the fuel stream, the primary oxidant stream and the secondary oxidant streams.

FIG. 1 and FIG. 2 illustrate an example in which two of the secondary oxidant nozzles 4 are provided, but the present invention is not limited to this configuration, and three or more secondary oxidant nozzles 4 may also be used. In the case of three or more secondary oxidant nozzles 4, if the structure is viewed in plan view, then the fuel nozzle 2 is preferably positioned at a position equivalent to the center of the shape formed having each of the secondary oxidant nozzles 4 at an apex. The following description focuses on the case in which two secondary oxidant nozzles 4 are provided.

Next is a description of the lines used for supplying fluid to each of the nozzles.

Figure 3:
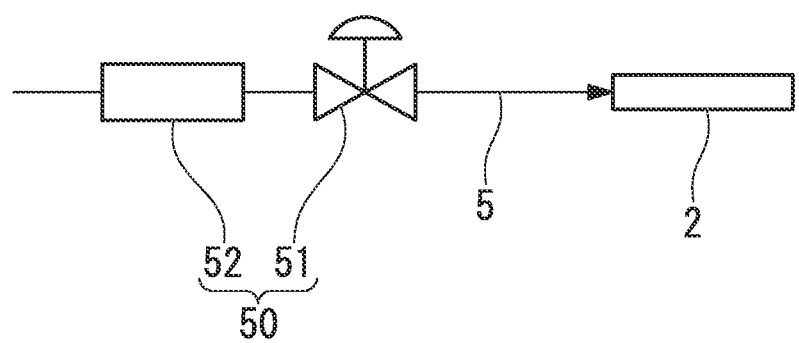
FIG. 3 is a schematic view illustrating one example of a fuel nozzle used in the first embodiment of the present invention.

As illustrated in FIG. 3, a fuel supply line 5 that supplies the fuel stream is connected to the fuel nozzle 2. Natural gas (LNG) is a typical example of the fuel stream, but a liquid fuel such as a heavy oil may also be used.

Furthermore, a forced oscillation device 50 for causing a periodic change in the flow rate of the fuel stream is provided within the fuel supply line 5. Specifically, this forced oscillation device 50 describes a control unit containing a flow rate control valve 51 provided within the fuel supply line 5, and a flow rate meter 52 that controls the flow rate control valve 51.

Figure 4A:
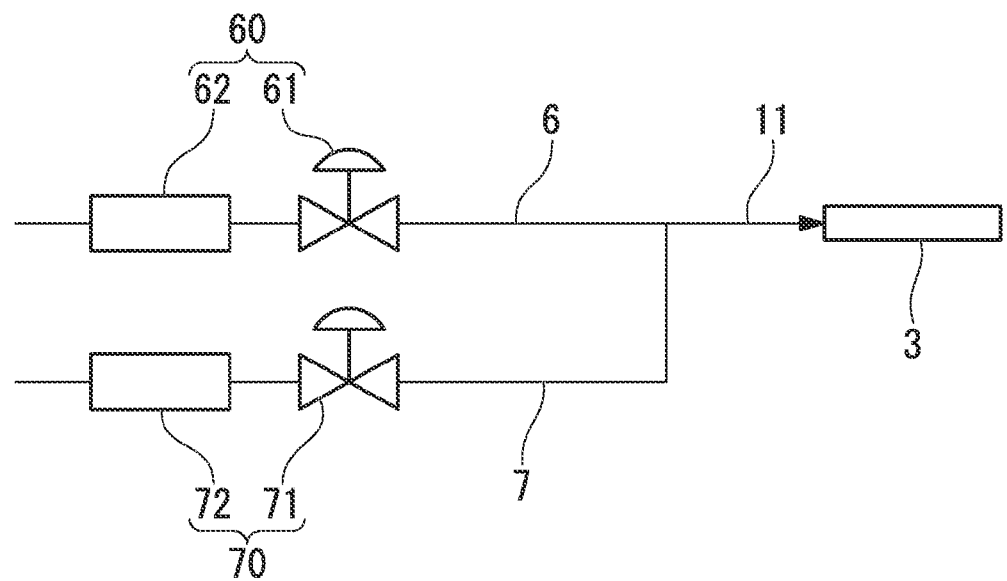
FIG. 4A is a schematic view illustrating one example of a primary oxidant nozzle used in the first embodiment of the present invention.

As illustrated in FIG. 4A, a primary oxidant supply line 11 that supplies the primary oxidant stream is connected to the primary oxidant nozzle 3. The primary oxidant supply line 11 branches upstream into a primary air supply line 6 that supplies air and a primary oxygen supply line 7 that supplies oxygen. The primary oxidant stream is a mixed gas of air and oxygen, but nitrogen gas, carbon dioxide gas or a combustion exhaust gas or the like may also be used instead of air. Substantially pure oxygen such as industrial pure oxygen is preferably used as the oxygen.

Forced oscillation devices 60 and 70 for causing periodic change in the flow rate of the air and the flow rate of the oxygen respectively are provided within the primary air supply line 6 and the primary oxygen supply line 7 respectively. Specifically, these forced oscillation devices 60 and 70 describe control units each containing a flow rate control valve 61 or 71 provided within the primary air supply line 6 or the primary oxygen supply line 7, and a flow rate meter 62 or 72 that controls the flow rate control valve 61 or 71.

In those cases where an oxidant having a fixed oxygen concentration is used as the primary oxidant stream, then an oxidant that has been fixed at that particular concentration need simply be supplied, and therefore the primary oxidant supply line 11 need not branch upstream, and a forced oscillation device (not shown in the drawing) may simply be provided within the primary oxidant supply line 11.

Figure 4B:
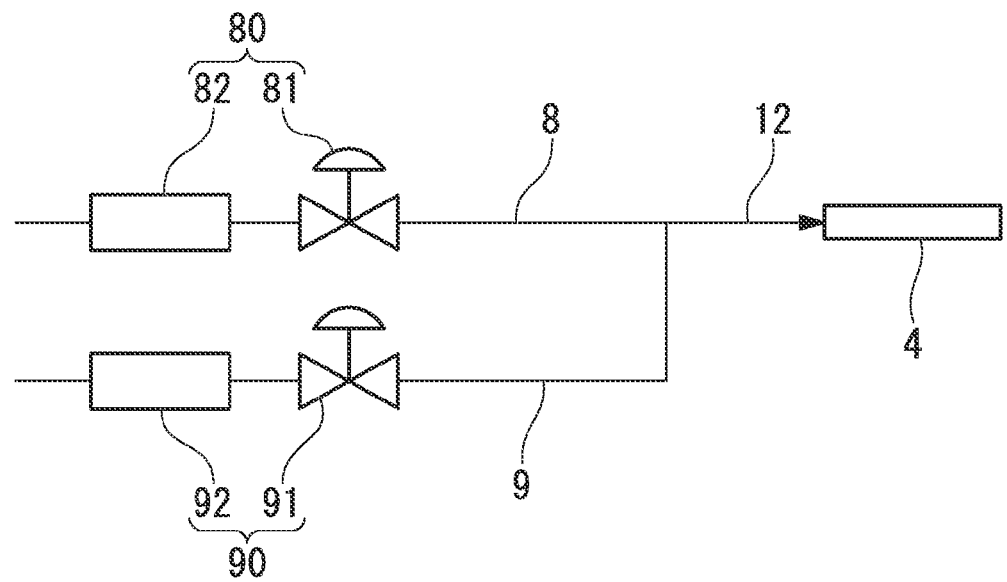
FIG. 4B is a schematic view illustrating one example of a secondary oxidant nozzle used in the first embodiment of the present invention

The secondary oxidant nozzles 4 are controlled in the same manner as the primary oxidant nozzle 3. In other words, as illustrated in FIG. 4B, a secondary oxidant supply line 12 that supplies the secondary oxidant stream is connected to each of the secondary oxidant nozzles 4. The secondary oxidant supply line 12 branches upstream into a secondary air supply line 8 that supplies air and a secondary oxygen supply line 9 that supplies oxygen. The secondary oxidant stream is a mixed gas of air and oxygen, but nitrogen gas, carbon dioxide gas or a combustion exhaust gas or the like may also be used instead of air. Substantially pure oxygen such as industrial pure oxygen is preferably used as the oxygen.

Forced oscillation devices 80 and 90 for causing periodic change in the flow rate of the air and the flow rate of the oxygen respectively are provided within the secondary air supply line 8 and the secondary oxygen supply line 9 respectively. Specifically, these forced oscillation devices 80 and 90 describe control units each containing a flow rate control valve 81 or 91 provided within the secondary air supply line 8 or the secondary oxygen supply line 9, and a flow rate meter 82 or 92 that controls the flow rate control valve 81 or 91.

In those cases where an oxidant having a fixed oxygen concentration is used as the secondary oxidant stream, then an oxidant that has been fixed at that particular concentration need simply be supplied, and therefore the secondary oxidant supply line 12 need not branch upstream, and a forced oscillation device (not shown in the drawing) may simply be provided within the primary oxidant supply line 12.

Further, because two of the secondary oxidant nozzles 4 are provided, as illustrated in FIG. 5, the secondary oxidant supply line 12 is formed so as to branch into two downstream, enabling the secondary oxidant stream to be supplied to both of the secondary oxidant nozzles 4.

Accordingly, when the flow rate and the oxygen concentration of the secondary oxidant stream supplied to each of the secondary oxidant nozzles 4 is changed periodically, the changes occur with the same frequency for both secondary oxidant nozzles 4.

The fuel stream and oxidant streams are supplied via the above lines 5, 11 and 12 to each of the nozzles 2, 3 and 4. By controlling each of the forced oscillation devices 50, 60, 70, 80 and 90, the flow rate of the fluid jetted from each of the nozzles 2, 3 and 4 can be controlled.

<Flow Rate Control>

Next is a description of control of the flow rate of the fluid supplied from each of the nozzles 2, 3 and 4.

In the following description, for the sake of convenience, it is assumed that pure oxygen is supplied from the primary oxygen supply line 7 and the secondary oxygen supply line 9, air (having an oxygen concentration of approximately 21%) is supplied from the primary air supply line 6 and the secondary air supply line 8, and liquefied natural gas (LNG) is supplied from the fuel supply line 5.

First is a description of the relationship between the flow rate of an oxidant stream and the oxygen concentration of the oxidant stream, using the primary oxidant stream as an example. The secondary oxidant streams also adopt the same relationship.

The flow rates of the air and pure oxygen that constitute the primary oxidant stream can be changed using the forced oscillation device 60 and the forced oscillation device 70 respectively.

When the flow rate of the primary oxidant stream is constant, if the flow rates of the pure oxygen and air are both kept constant, then the oxygen concentration will be constant.

Figure 6:
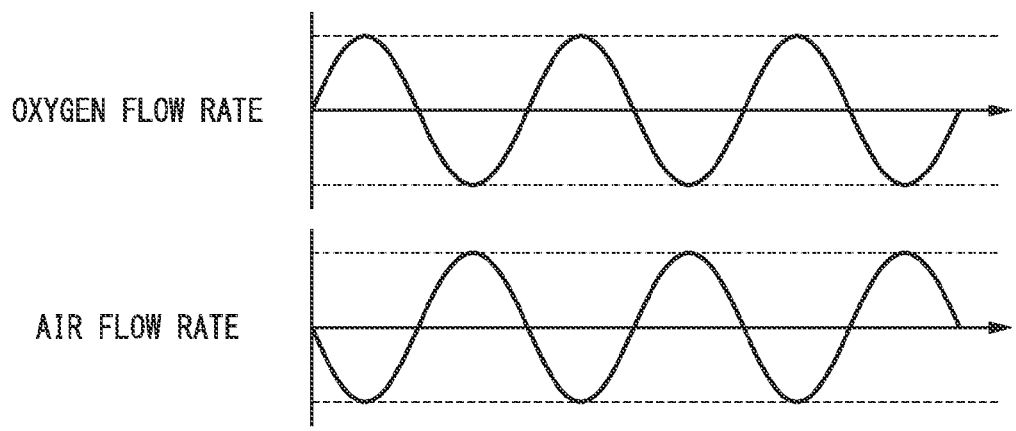
FIG. 6 is a diagram illustrating one example of periodic changes in the oxygen flow rate and the air flow rate in the first embodiment of the present invention.

On the other hand, if the flow rate of the primary oxidant stream is kept constant, while the flow rate of pure oxygen and the flow rate of air are changed periodically with the same waveform and the same fluctuation range but with a phase difference of $\pi$, as illustrated in FIG. 6, then the oxygen concentration can be changed periodically. By adopting this type of configuration, because the increases and decreases in the flow rates of pure oxygen and air cancel each other out, the flow rate of the primary oxidant stream itself can be controlled at a constant level.

In this case, if the flow rates are controlled so that the minimum values for the flow rates of pure oxygen and air both reach zero, then the oxygen concentration within the primary oxidant stream can be changed within a range from approximately 21% to 100%.

In other words, when the flow rate of pure oxygen is zero, the oxygen concentration of the primary oxidant stream will be equal to the oxygen concentration of air, meaning the oxygen concentration is approximately 21%. In contrast, when the flow rate of air is zero, the primary oxidant stream will be composed solely of pure oxygen, meaning the oxygen concentration is 100%.

Figure 7:
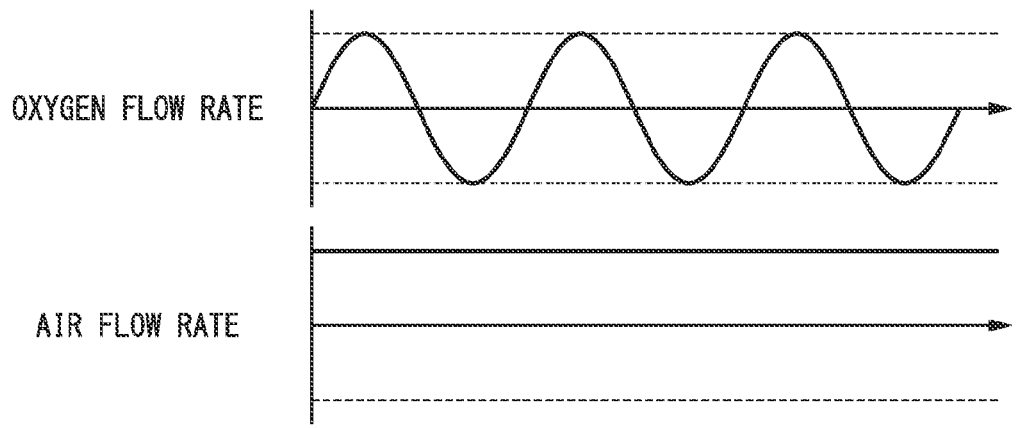
FIG. 7 is a diagram illustrating another example of periodic changes in the oxygen flow rate and the air flow rate in the first embodiment of the present invention.

Further, when the flow rate of the primary oxidant stream is changed periodically, then as illustrated in FIG. 7, the flow rate of pure oxygen can be changed periodically, while the air is provided at a constant flow rate. In this case, when the flow rate of pure oxygen reaches a maximum, the oxygen concentration reaches a maximum, and when the flow rate of pure oxygen is at a minimum, the oxygen concentration is also at a minimum.

For example, if the flow rate of pure oxygen is controlled so that the maximum value is the same as the flow rate of air and the minimal value is zero, then the oxygen concentration can be changed periodically within a range from approximately 21% to approximately 61%. In other words, when the flow rate of pure oxygen is at a maximum, the ratio between the flow rates of pure oxygen and air is 1 to 1, and the oxygen concentration within the primary oxidant stream is approximately 61%. Further, when the flow rate of pure oxygen is at a minimum, the primary oxidant stream will be composed solely of air, meaning the oxygen concentration is approximately 21%.

As an example of a method of periodically changing the flow rate of the primary oxidant stream, the above description presents a method in which the flow rate of air is held constant while the flow rate of pure oxygen is changed periodically, but the flow rate of pure oxygen may be held constant while the flow rate of air is changed periodically, or both flow rates may be changed periodically.

In the manner described above, the flow rate of the oxidant stream and the oxygen concentration are controlled.

Next is a description of the oxygen ratio. The oxygen ratio describes the value obtained by dividing the supplied amount of oxygen, supplied as the oxidant stream to the burner 3 and the burner 4, by the theoretically required amount of oxygen necessary for combusting the fuel fluid supplied to the burner 2. Accordingly, theoretically, the state in which the oxygen ratio is 1.0 describes the state in which complete combustion can be achieved without any excess or deficiency of oxygen. The theoretically required amount of oxygen for combustion of LNG, although dependent on the LNG composition, is typically a molar ratio of approximately 2.3 times the amount of LNG.

Next is a description of the control of the fuel stream, the primary oxidant stream and the secondary oxidant stream in the present embodiment.

In the present embodiment, the flow rate of the fuel stream is kept constant, while the flow rate of at least one of the primary oxidant stream and the secondary oxidant streams is changed periodically. Further, the flow rates are controlled so that the oxygen concentration within the oxidant stream composed of the primary oxidant stream and the secondary oxidant streams is changed periodically, and a periodic change is also imparted to the oxygen ratio.

Control is performed so that a difference is provided between the periodic change in the oxygen concentration and the periodic change in the oxygen ratio. In particular, control is preferably performed so that a state having a low oxygen ratio and a high oxygen concentration, and a state having a high oxygen ratio and a low oxygen concentration exist periodically.

Here, the expression that a difference is provided between the periodic changes refers to any state other than the state in which the waveforms, frequencies and phases completely coincide. For example, even if the waveforms of the oxygen ratio and the oxygen concentration are both sine waves, and both waveforms have the same frequency, if a phase difference exists between the waveforms, then this is deemed to be a provided difference in the periodic changes.

In one example of the type of control described above, the flow rate of the air and the flow rate of pure oxygen supplied to the primary oxidant stream are both kept constant, the flow rate of pure oxygen supplied to the secondary oxidant streams is kept constant, and the flow rate of the air supplied to the secondary oxidant streams is changed periodically.

In this case, although the flow rate of the primary oxidant stream is constant, the flow rate of the secondary oxidant streams changes periodically.

Further, looking at the combined oxidant stream, although the flow rates of the air and pure oxygen supplied to the primary oxidant stream and the pure oxygen supplied to the secondary oxidant streams are all constant, because the flow rate of the air supplied to the secondary oxidant streams changes periodically, the oxygen concentration also changes periodically. Specifically, when the flow rate of the air supplied to the secondary oxidant streams reaches a maximum, the oxygen concentration falls to a minimum, whereas when the flow rate of the air supplied to the secondary oxidant streams is at a minimum, the oxygen concentration reaches a maximum.

Furthermore, because the flow rate of the fuel stream is constant, the theoretically required amount of oxygen remains constant.

Looking at the combined oxidant stream, the absolute amount of supplied oxygen will reach a maximum when the flow rate of air supplied to the secondary oxidant streams is at a maximum, whereas the amount of oxygen will be at a minimum when the flow rate of air supplied to the secondary oxidant streams is at a minimum.

Accordingly, the oxygen ratio calculated by dividing the supplied amount of oxygen by the theoretically required amount of oxygen reaches a maximum when the flow rate of air supplied to the secondary oxidant streams is at a maximum, whereas the oxygen ratio is at a minimum when the flow rate of air supplied to the secondary oxidant streams is at a minimum.

In other words, in the control example described above, the oxygen ratio reaches a maximum when the oxygen concentration is at a minimum, whereas the oxygen ratio is at a minimum when the oxygen concentration reaches a maximum, meaning a difference exists in the periodic changes of the oxygen concentration and the oxygen ratio.

The above control method is merely one example, and the present invention is not limited to this type of control. The flow rates of the air and pure oxygen supplied to the primary oxidant stream and the air and pure oxygen supplied to the secondary oxidant streams may be controlled appropriately within the desired ranges.

Periodically changing the flow rate of the secondary oxidant streams is particularly preferred, and the frequency of the periodic change is preferably at least 0.01 Hz but not more than 20 Hz, and more preferably at least 0.02 Hz but not more than 2 Hz.

Further, the flow rate of the primary oxidant stream relative to the flow rate of the overall oxidant stream, on a time-averaged basis, is preferably at least 10% but not more than 70%, and more preferably at least 10% but not more than 50%. Expressed another way, the flow rate of the secondary oxidant stream relative to the flow rate of the overall oxidant stream, on a time-averaged basis, is preferably at least 30% but not more than 90%, and more preferably at least 50% but not more than 90%.

Further, the oxygen concentration within the oxidant stream is preferably at least 5% but not more than 100%, and more preferably at least 21% but not more than 100%.

In terms of the oxygen ratio, this is controlled so as to change periodically, but the difference between the upper limit and the lower limit of the oxygen ratio (namely, the amplitude of the oxygen ratio) is preferably at least 0.2. Furthermore, the time-averaged value of the oxygen ratio is preferably at least 1.0, and more preferably 1.05 or greater.

Further, the periodic changes in the oxygen ratio and the oxygen concentration preferably occur with the same frequency, and the phase difference between the changes is preferably at least $\pi/2$ but not more than $3\pi/2$ (namely, the absolute value of the phase difference between the oxygen ratio and the oxygen concentration is at least $\pi/2$). The phase difference is most preferably $\pi$.

According to the burner combustion method of the present embodiment, because the oxidant stream is composed of a primary oxidant stream jetted from around the periphery of the fuel stream or from a position near the fuel stream, and a plurality of secondary oxidant streams, the way in which the oxidant stream is supplied differs from that when combustion is performed in a conventional manner using a single oxidant stream. In addition, because the oxygen concentration and the oxygen ratio are changed periodically, and a difference is provided between these periodic changes, NOx can be reduced significantly and reliably.

Further, combustion using a burner assumes the use of a heat utilization facility or apparatus such as a melting furnace or a heating furnace, and of course, from the viewpoint of energy conservation, improving the heat utilization efficiency is of critical importance. Limiting the discharge of carbon dioxide gas is also required. The burner combustion method of the present embodiment is also able to satisfy these demands.

Moreover, the burner combustion method of the present embodiment can not only be applied when designing new combustors, but can also be applied to the burners of existing combustors.

Second Embodiment

Next is a description of a burner combustion method that represents a second embodiment of application of the present invention.

This embodiment is a modified example of the first embodiment, and descriptions are omitted for those portions that are the same as the first embodiment.

Comparison of the present embodiment with the first embodiment reveals that this embodiment differs in that control is performed so that the flow rate of the fuel stream changes periodically. The remaining configuration of the burner is the same as the first embodiment.

The flow rate of the fuel stream is changed periodically in this embodiment, and the periodic change in the flow rate of the fuel stream and the periodic change in the oxygen ratio are controlled so as to occur at the same frequency.

Further, the phase difference between the periodic changes in the flow rate of the fuel stream and the oxygen ratio is preferably controlled so as to be at least $\pi/2$ but not more than $3\pi/2$ (namely, the absolute value of the phase difference between the periodic changes in the flow rate of the fuel stream and the oxygen ratio is at least $\pi/2$). The phase difference is most preferably $\pi$.

In one example of the type of control described above, the flow rate of the primary air and the flow rate of the primary oxygen supplied to the primary oxidant stream are both kept constant, the flow rate of pure oxygen supplied to the secondary oxidant streams is kept constant, the flow rate of the air supplied to the secondary oxidant streams is changed periodically, and the flow rate of the fuel stream is controlled so as to achieve a phase difference of it relative to this periodic change in the flow rate of the air supplied to the secondary oxidant streams.

In this case, the flow rate of the primary oxidant stream remains constant, but the flow rate of the secondary oxidant streams is changed periodically.

Further, because the flow rate of the secondary oxidant streams changes periodically, the oxygen concentration also changes periodically, and when the flow rate of air supplied to the secondary oxidant streams reaches a maximum, the oxygen concentration is at a minimum, whereas when the flow rate of air supplied to the secondary oxidant streams is at a minimum, the oxygen concentration reaches a maximum.

Looking at the combined oxidant stream, when the flow rate of air supplied to the secondary oxidant streams is at a maximum, the amount of oxygen reaches a maximum, and when the flow rate of air supplied to the secondary oxidant streams is at a minimum, the amount of oxygen is also at a minimum.

On the other hand, when the flow rate of air supplied to the secondary oxidant streams is at a maximum, the flow rate of the fuel stream is at a minimum, and the theoretically required amount of oxygen also falls to its smallest value. In contrast, when the flow rate of air supplied to the secondary oxidant streams is at a minimum, the flow rate of the fuel stream reaches a maximum, and the theoretically required amount of oxygen also reaches a maximum.

Accordingly, the oxygen ratio calculated by dividing the supplied amount of oxygen by the theoretically required amount of oxygen reaches a maximum when the flow rate of air supplied to the secondary oxidant streams is at a maximum, whereas the oxygen ratio is at a minimum when the flow rate of air supplied to the secondary oxidant streams is at a minimum.

In other words, in the control example described above, the periodic changes in the oxygen concentration, the oxygen ratio and the flow rate of the fuel stream are controlled so that the oxygen ratio reaches a maximum and the flow rate of the fuel stream is at a minimum when the oxygen concentration is at a minimum, whereas the oxygen ratio is at a minimum and the flow rate of the fuel stream is at a minimum when the oxygen concentration reaches a maximum.

The above control method is merely one example, and the present invention is not limited to this type of control. The flow rates of the fuel stream, the air and pure oxygen supplied to the primary oxidant stream, and the air and pure oxygen supplied to the secondary oxidant streams may be controlled appropriately within the desired ranges.

In a similar manner to the first embodiment, in the burner combustion method of the present embodiment, the way in which the oxidant stream is supplied differs from that when combustion is performed in a conventional manner using a single oxidant stream, and as a result, NOx can be reduced significantly and reliably.

While the present invention has been described above on the basis of preferred embodiments, it should be understood that the present invention is in no way limited by the embodiments described above. Needless to say, various modifications can be made without departing from the spirit or scope of the present invention.

For example, when the flow rate of the fuel stream, or the flow rate of the air or oxygen that constitutes the primary oxidant stream or the secondary oxidant streams is changed periodically, the periodic change need not necessarily form a sine wave, and a supply pattern that results in a flow rate change having a square waveform or triangular waveform may also be used.

EXAMPLES

The NOx reduction effects achieved when burner combustion is conducted while periodically changing the flow rate of the secondary oxidant streams are described below using a series of examples. The present invention is in no way limited by these examples, and appropriate modifications can be made without departing from the spirit or scope of the present invention.

Example 1

In Example 1, tests were performed using a burner 1 in which, as illustrated in FIG. 1 and FIG. 2, a primary oxidant nozzle 3 was positioned in the side surface of a rectangular test furnace so as to encircle the outer periphery of a fuel nozzle 2, and two secondary oxidant nozzles 4 were positioned in the same plane in bilaterally symmetrical positions centered across the fuel nozzle 2. The distance l between the two secondary oxidant nozzles 4 was 50 cm, and the flow velocity of the secondary oxidant streams jetted from the secondary oxidant nozzles 4 was 100 m/s. In the bottom portion of the test furnace, a plurality of water-cooled tubes were disposed in a direction orthogonal to the jetting direction of the nozzles, and a resistance temperature detector was inserted into the inlet and outlet of each water-cooled tube.

LNG was used as the fuel, the flow rate of the fuel stream was kept constant, the time-averaged oxygen ratio was set to 1.05, and the time-averaged oxygen concentration within the oxidant stream (the combination of the primary oxidant stream and the secondary oxidant streams) was set to a value of 40%, which is an amount at which a reduction in the amount of exhaust gas can generally be expected.

Further, on a time-averaged basis, relative to the combination of the flow rate of oxygen contained within the primary oxidant stream and the flow rate of oxygen contained within the secondary oxidant streams (namely, relative to the total amount of oxygen supplied to the burner 1), the flow rate of oxygen contained within the primary oxidant stream was set to 30%, and the flow rate of oxygen contained within the secondary oxidant streams was set to 70%. In other words, oxygen equivalent to 31.5% of the theoretically required amount of oxygen was supplied from the primary oxidant stream, and on a time-averaged basis, 73.5% of the theoretically required amount of oxygen was supplied from the secondary oxidant streams.

Figure 8:
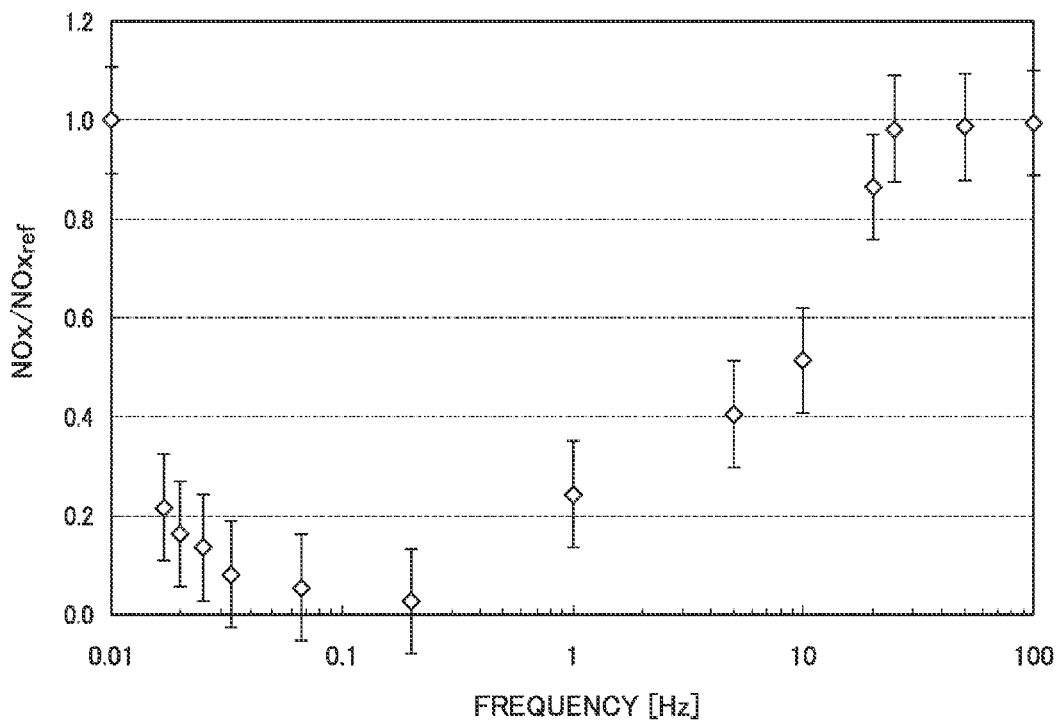
FIG. 8 is a graph illustrating the relationship between the frequency and the NOx concentration in one example of the present invention.
Figure 9:
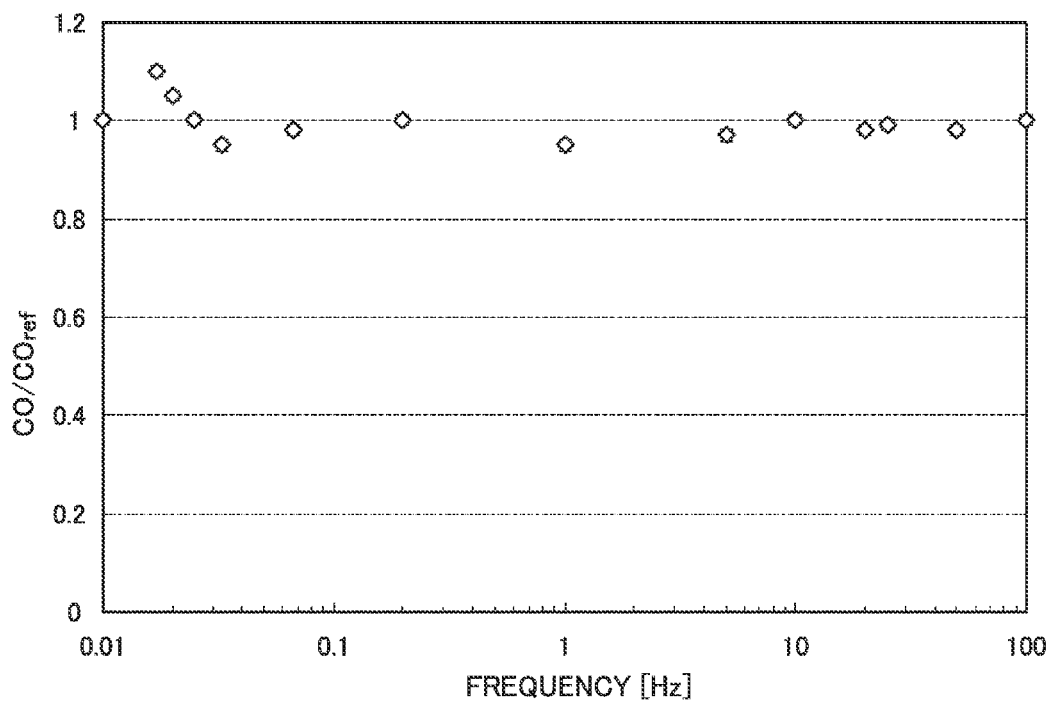
FIG. 9 is a graph illustrating the relationship between the frequency and the CO concentration in one example of the present invention.
Figure 10:
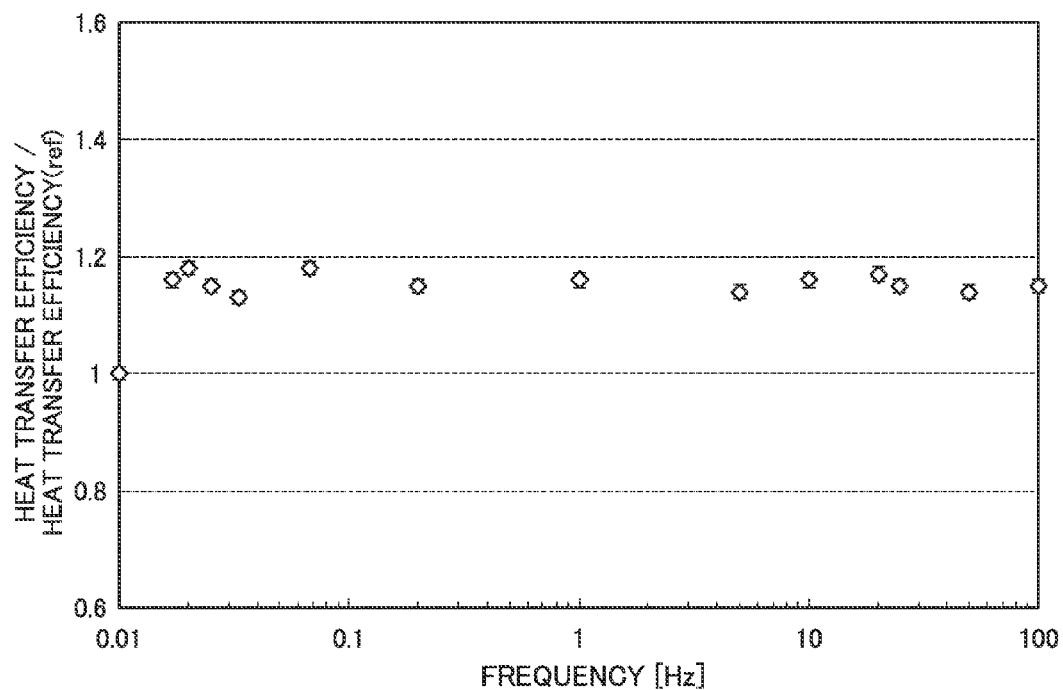
FIG. 10 is a graph illustrating the relationship between the frequency and the heat transfer efficiency in one example of the present invention.

The flow rate of the primary oxidant stream was kept constant, and the flow rates of oxygen and air within the secondary oxidant streams were changed periodically. A test was performed with the oxygen concentration changed within a range from at least 21% to not more than 100%, and the oxygen ratio changed within a range from at least 0.6 to not more than 1.5, with the frequency of the changes varied within a range from 0.017 Hz to 100 Hz, and the NOx emission rate, the CO concentration and the heat transfer efficiency were measured. The results for the NOx emission rate are illustrated in FIG. 8, the results for the CO concentration are illustrated in FIG. 9, and the results for the heat transfer efficiency are illustrated in FIG. 10. The NOx emission rate was measured by suctioning the exhaust gas continuously from the flue using a suction pump, and then using a chemiluminescence-based continuous NOx concentration measurement apparatus to measure the NOx concentration. The CO concentration was measured by suctioning the exhaust gas continuously from the flue using a suction pump, and then using an infrared absorption-based continuous CO concentration measurement apparatus to measure the CO concentration. The heat transfer efficiency was determined by calculating the amount of heat transfer from the temperature change and the flow rate of the water flowing through the water-cooled tubes positioned in the bottom of the test furnace.

In order to analyze the test results, the NOx emission rate, the CO concentration and the heat transfer efficiency were also measured for an example of the conventional technology, in which a burner having a structure in which an oxidant nozzle was positioned around the periphery of the fuel nozzle was used, and normal combustion was performed with the oxygen concentration fixed at 40%. These values were recorded as a reference value NOx(ref), a reference value CO(ref), and a reference heat transfer efficiency(ref) respectively.

In FIG. 8 to FIG. 10, the horizontal axes represent the frequency, and the vertical axes represent the NOx emission rate normalized using the reference value NOx(ref) (NOx/NOx(ref)), the CO concentration normalized using the reference value CO(ret) (CO/CO(ref)), and the heat transfer efficiency normalized using the reference heat transfer efficiency (ref) (heat transfer efficiency/heat transfer efficiency(ref)) respectively.

As is evident from FIG. 8, by using the secondary oxidant streams and periodically changing the flow rate of those secondary oxidant streams, the NOx emission rate was able to be significantly reduced. Further, it was also evident that the NOx emission rate tended to increase rapidly when the frequency of the change in the flow rate of the secondary oxidant streams reached 20 Hz, and therefore the frequency is preferably set to 20 Hz or less.

Further, as is evident from FIG. 9, regardless of whether or not the secondary oxidant streams were used, and regardless of the frequency of the periodic change in the flow rate of the secondary oxidant streams, there tended to be little effect on the CO concentration.

Furthermore, as is evident from FIG. 10, by periodically changing the flow rate of the secondary oxidant streams, the heat transfer efficiency was able to be increased. Further, the heat transfer efficiency tended to be largely unaffected by the frequency of the secondary oxidant streams.

Example 2

Next, in Example 2, the distance l between the two secondary oxidant nozzles 4 was changed, and the effect on the NOx emission rate was investigated. Specifically, the frequency of the secondary oxidant streams was varied within a range from 0.017 Hz to 100 Hz under 5 different conditions in which the distance l between the two secondary oxidant nozzles 4 was set to 10, 20, 30, 40 or 50 cm. The remaining conditions were the same as those used for Example 1.

Figure 11:
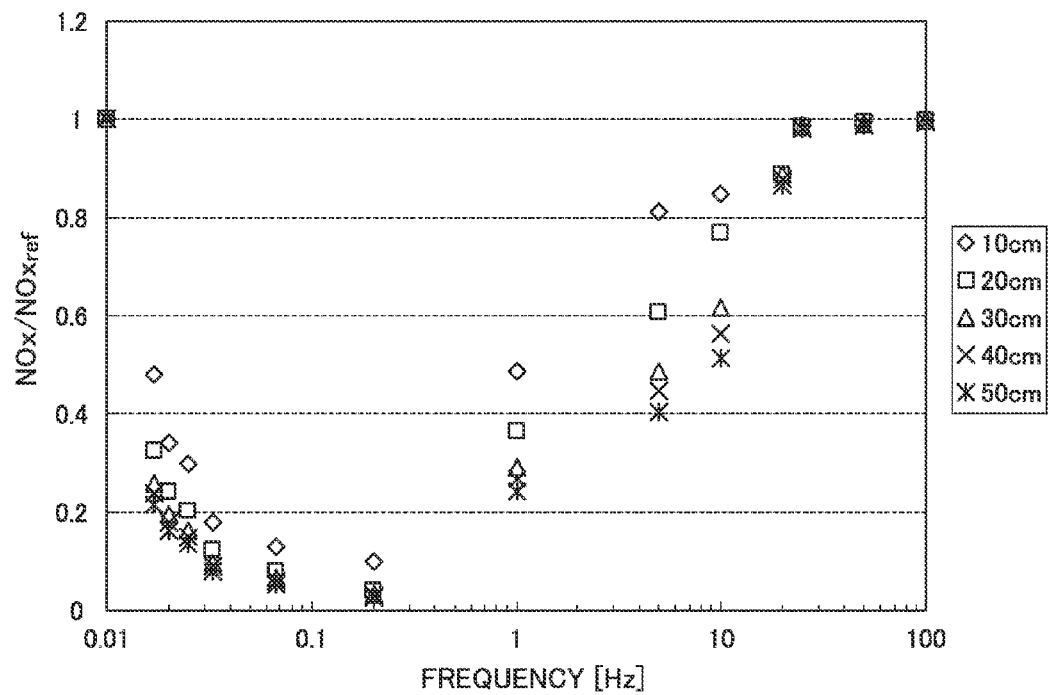
FIG. 11 is a graph illustrating the relationship between the frequency and the NOx concentration in one example of the present invention.

The results of measuring the NOx emission rate are shown in FIG. 11.

In FIG. 11, the horizontal axis represents the frequency, and the vertical axis represents the NOx emission rate normalized using the reference value NOx(ref) from Example 1.

As is evident from FIG. 11, increasing the distance l between the secondary oxidant nozzles 4 reduced the NOx emission rate. Further, it was also evident that the NOx emission rate tended to increase rapidly when the frequency of the change in the flow rate of the secondary oxidant streams reached 20 Hz, and therefore the frequency is preferably set to 20 Hz or less.

When the CO concentration was measured in Example 2, the distance between the nozzles was found to have no significant effect on the CO concentration.

Furthermore, the heat transfer efficiency was also measured in Example 2, but the distance between the nozzles tended to have no significant effect on the heat transfer efficiency.

Example 3

Next, in Example 3, the flow velocity of the secondary oxidant streams was changed by altering the nozzle diameter, and the effect on the NOx emission rate was investigated. Specifically, the frequency of the secondary oxidant streams was varied within a range from 0.017 Hz to 100 Hz under 7 different conditions in which the flow velocity of the secondary oxidant streams was set to 10 m/s, 20 m/s, 30 m/s, 60 m/s, 100 m/s, 200 m/s or 300 m/s. The remaining conditions were the same as those used for Example 1.

Figure 12:
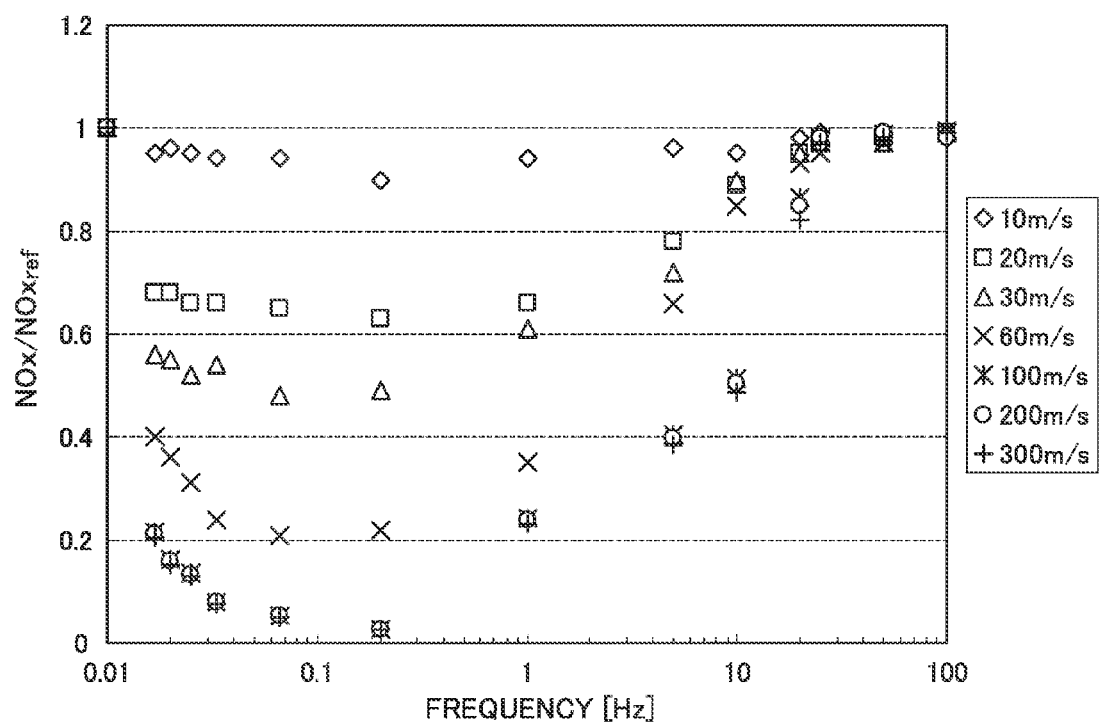
FIG. 12 is a graph illustrating the relationship between the frequency and the NOx concentration in one example of the present invention.

The results of measuring the NOx emission rate are shown in FIG. 12. In FIG. 12, the horizontal axis represents the frequency, and the vertical axis represents the NOx emission rate normalized using the reference value NOx(ref) from Example 1.

As is evident from FIG. 12, as the flow velocity of the secondary oxidant streams was increased, the NOx emission rate tended to decrease. In particular, it was found that a flow velocity of at least 20 m/s was preferable, and a flow rate of 60 m/s or greater was more preferable.

When the CO concentration was measured in Example 3, the flow velocity of the secondary oxidant streams was found to have no significant effect on the CO concentration.

Further, the heat transfer efficiency was also measured in Example 3, but the flow velocity of the secondary oxidant streams tended to have no significant effect on the heat transfer efficiency.

INDUSTRIAL APPLICABILITY

A burner combustion method that exhibits an NOx reduction effect and has practical value can be provided. The present invention relates to this burner combustion method, and can therefore be widely used in manufacturing processes that use a combustor.

DESCRIPTION OF THE REFERENCE SIGNS

1: Burner
2: Fuel nozzle
3: Primary oxidant nozzle
4: Secondary oxidant nozzle
5: Fuel supply line
11: Primary oxidant supply line
12: Secondary oxidant supply line
50, 60, 70, 80, 90: Forced oscillation device

The invention claimed is:

1. A burner combustion method for supplying and combusting an oxidant stream and a fuel stream, wherein
the oxidant stream is composed of a primary oxidant stream jetted from around a periphery of the fuel stream or from a position near the fuel stream, and a plurality of secondary oxidant streams, and
by periodically changing a flow rate of at least one of the primary oxidant stream and the plurality of secondary oxidant streams, and also
causing a periodic change in an oxygen concentration within the oxidant stream,
causing a periodic change in an oxygen ratio which is calculated by dividing a supplied amount of oxygen, supplied by the oxidant stream, by a theoretically required amount of oxygen, and
providing a difference between the periodic changes in the oxygen concentration and the oxygen ratio,
the combustion state adopts a periodic oscillating state.

2. The burner combustion method according to claim 1, wherein the plurality of secondary oxidant streams are jetted from symmetrical positions centered around the fuel stream.

3. The burner combustion method according to claim 1, wherein a ratio of a flow rate of the primary oxidant stream relative to a flow rate of the oxidant stream is at least 10% but not more than 70%.

4. The burner combustion method according to claim 1, wherein a flow rate of the secondary oxidant streams is changed periodically.

5. The burner combustion method according to claim 4, wherein a frequency of a periodic change in the flow rate of the secondary oxidant streams is at least 0.01 Hz but not more than 20 Hz.

6. The burner combustion method according to claim 1, wherein
- a difference between an upper limit and a lower limit of the periodically changing oxygen ratio is at least 0.2, and
- an average value of the oxygen ratio across a single period is at least 1.0.

7. The burner combustion method according to claim 1, wherein periodic changes in the oxygen concentration and the oxygen ratio have the same frequency.

8. The burner combustion method according to claim 7, wherein a phase difference between periodic changes in the oxygen concentration and the oxygen ratio is at least $\pi/2$ but not more than $3\pi/2$.

9. The burner combustion method according to claim 1, wherein
- a flow rate of the fuel stream is changed periodically,
- the periodic change in the flow rate of the fuel stream and the periodic change in the oxygen ratio have the same frequency, and
- a phase difference between the periodic changes in the flow rate of the fuel stream and the oxygen ratio is at least $\pi/2$ but not more than $3\pi/2$.

10. The burner combustion method according to claim 1, wherein the oxidant stream is composed of oxygen and air.

11. The burner combustion method according to claim 1, wherein the oxidant stream is composed of oxygen and a combustion exhaust gas.

12. The burner combustion method according to claim 11, wherein the oxygen is substantially pure oxygen.

* * * * *